(12) United States Patent
Håll et al.

(10) Patent No.: US 6,922,150 B2
(45) Date of Patent: Jul. 26, 2005

(54) SYSTEM FOR LEVEL GAUGING AND PROVIDING ALARMS FOR A STORAGE ROOM USING TWO GAUGING DEVICES FOR DETERMINING A CURRENT LEVEL VALUE

(75) Inventors: Ola Håll, Sävedalen (SE); Stig Larson, Sävedalen (SE); Daniel Johansson, Göteborg (SE)

(73) Assignee: Saab Rosemount Tank Radar AB, Gotebrog (SE)

( * ) Notice: Subject to any disclaimer, the term of this patent is extended or adjusted under 35 U.S.C. 154(b) by 0 days.

(21) Appl. No.: 10/324,144

(22) Filed: Dec. 20, 2002

(65) Prior Publication Data

US 2004/0036617 A1 Feb. 26, 2004

(30) Foreign Application Priority Data

Aug. 22, 2002 (SE) .............................................. 0202491

(51) Int. Cl.[7] .............................................. G08B 21/00
(52) U.S. Cl. ........................ 340/612; 340/616; 73/1.31; 73/290 R; 342/124
(58) Field of Search ................................ 340/612, 600, 340/616; 73/1.31, 1.73, 290 R, 290 V, 291, 307, 1.74; 342/124, 118; 137/386, 551

(56) References Cited

U.S. PATENT DOCUMENTS

| 4,665,403 A | 5/1987 | Edvardsson |
| 4,942,351 A | 7/1990 | Kronau |
| 5,946,967 A | 9/1999 | Russell |
| 6,047,598 A * | 4/2000 | Otto et al. ................. 73/290 V |
| 6,684,919 B2 * | 2/2004 | Gaiser .......................... 141/95 |

FOREIGN PATENT DOCUMENTS

| DE | 3938742 | 5/1991 |
| EP | 0621462 | 10/1994 |
| WO | 95/20127 | 7/1995 |
| WO | 01/02818 | 1/2001 |

* cited by examiner

*Primary Examiner*—Jeffery Hofsass
*Assistant Examiner*—Eric Blount
(74) *Attorney, Agent, or Firm*—Westman, Champlin & Kelly, P.A.

(57) ABSTRACT

Method and device for calculating the level of the surface of a product in a storage room by a radar level gauging system, which includes a first gauging device for calculating a first value of level and functionally separated from the first gauging device a second gauging device for calculating a second value of said level, wherein: a first signal is produced being dependent of a preset first threshold value of the level in the first gauging device, a first current level value signal is output from the first gauging device, a second signal is produced in dependence of a preset second threshold value of the level in the second gauging device, a second current level value signal is output from the second gauging device and the value of the current level of said surface is presented by an indicating unit adapted to receive at least one of the first level value signal and the second level value signal for evaluation of the current level value.

11 Claims, 1 Drawing Sheet

SYSTEM FOR LEVEL GAUGING AND PROVIDING ALARMS FOR A STORAGE ROOM USING TWO GAUGING DEVICES FOR DETERMINING A CURRENT LEVEL VALUE

TECHNICAL FIELD

The present invention relates to a level gauging system for measuring the level of a surface of a medium stored in a storage room by use of a level guage, wherein said system uses two independent level gauges for fulfilling the service of three independent level sensing functions. In the present disclosure the level gauges are exemplified by radar level gauges, wherein the radar of said guages transmits microwaves towards said surface and receives microwaves reflected by said surface.

BACKGROUND OF THE INVENTION

There is known in the art to measure the level of the surface of a medium stored in a container by means of a radar level gauge. Such devices are disclosed in a number of documents. As an example of such a document, it will here be referred to U.S. Pat. No. 4,665,403.

For reasons of security, in a container, in almost all cases, a cargo which requires a closed gauging device also requires both a high level alarm and an overfill control. A cargo tank containing such a product therefore requires three sensors:

1. Level gauging sensor for measuring at all levels.
2. High level alarm.
3. Overfill control.

It should be mentioned here that an overfill control system comprises an overfill alarm system. According to security rules the three listed sensors must function independently of each other. A fault of one sensor must not render either of the other sensors inoperative. International patent publication WO 01/02818 discloses a level gauging system based upon independent radar measuring channels for determining the level of a product in a container. In said publication the three channels in the gauging system use a common antenna. One use of such a system is to use one of each separate channel for the purpose of achieving a level gauge, a high level alarm and an overfill control, each in a separate channel. If it would be possible, at least from cost aspects, a more simple system would be preferred. The invention disclosed in this description shows a solution for arriving at a level gauging system for fulfilling the above mentioned three level gauging functions in a simple and cost reduced way.

Not yet published patent document SE 0200080-0 shows an example of more than one level gauge coupled in parallel to an evaluation unit for determining the best value of, for example, a level value from said level gauges, but there is in said document nothing disclosed about any means for reducing the number of independent level gauges.

DESCRIPTION OF THE INVENTION

According to one aspect of the present invention, there is disclosed a level gauging system for calculating the level of the surface of a product in a storage room, wherein the system comprises a first gauging device for calculating a first value of said level and functionally separated from said first gauging device a second gauging device for calculating a second value of said level, wherein:

the first gauging device is adapted to produce a first signal in dependence of a preset first threshold value of said level and to output a first current level value signal, the second device is adapted to produce a second signal in dependence of a preset second threshold value of said level and to output a second current level value signal and the system includes an indicating unit receiving at least one of said first level value signal and said second level value signal for presenting the value of the current level of said surface.

Said first signal is intended to activate a first alarm which could be a high level alarm. Said second signal is intended to activate a second alarm which could be included in an overfill control.

The normal measuring of the current value of the surface level of the product is achieved by use of the calculations of the level in both gauging devices. As stated, a signal is output from each of said gauging devices to said indicating unit which presents said current level to an operator. The two signals, each of which represents the level of the surface of the product, are compared and used for arriving at a measured value with a better accuracy then any of the individual signals. The comparison can include that the mean value or that the median value of the two independent measured levels are calculated.

The two independent levels are preferably measured by means of radar level gauging devices, where a microwave signal is sent to and reflected back from the surface of said product in the storage room. The reflected microwave signal is received by a radar and an evaluation unit calculates the distance from an antenna of the radar level gauge to said surface. By use of the knowledge of said distance, the level of the surface of the product can easily be calculated. It may further be mentioned here that the phrase storage room is used for the room, where the product is stored. This is stated as said storage room could be a tank of a vessel, a container or any other room for storing a product, the surface level of which should be supervised. A rock shelter containing a product or a power station reservoir are mentioned here as examples of alternative storage rooms.

There are only two (independent) complete measuring channels connected to an antenna, commonly used by both channels needed. One channel is represented by said high level alarm components and functions and the other channel represents the overfill control components and functions. The processing units in one channel are galvanically isolated (which means that they are electrically isolated from one another in DC terms) from the processing units of the other channel. The two channels use galvanically isolated network communication between the processings units of the respective channels and the indicating unit. By this arrangement, there is achieved an individual functionality performance of the high level alarm channel and of the overfill control channel. Further, a correct product surface level is evaluated in the indication unit by use of the calculated values from any or both of the two individual channels.

A full functionality level gauge including a high level alarm and an overfill control is achieved with mutually independence between the high level alarm and the overfill control with the great advantage that the hardware of the configuration provide mutually independence between the level gauging function and any one of the high level alarm and the overfill control.

In this disclosed configuration, the level gauging is dependent of one or the other of the sensors and processing functions belonging to the high level alarm or the overfill control. Due to redundant data evaluation, safety of at least one failure in any one of the alarm channels (high level alarm and overfill control) is resolved. By this, there is disclosed that full safetty can be achieved by installation of two gauging devices, instead of three.

PREFERRED EMBODIMENTS OF THE INVENTION

Figure 2:
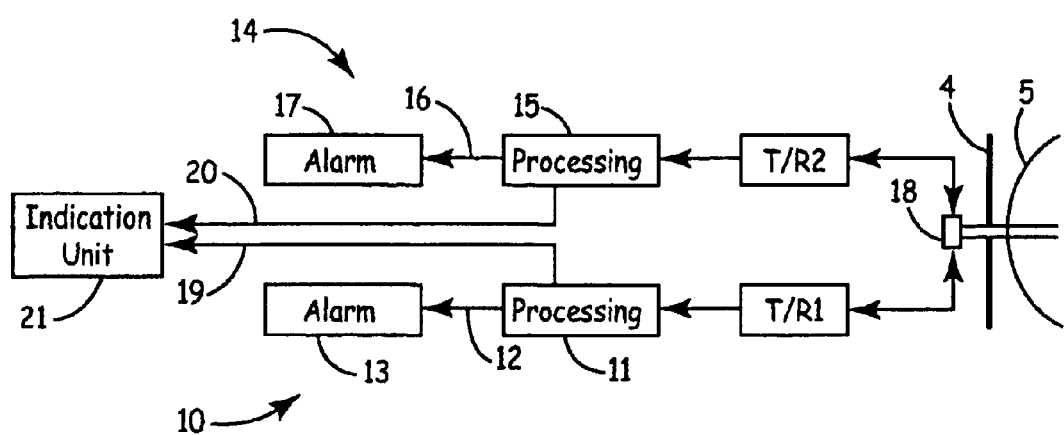
FIG. 2 shows a view of an arrangement of a radar level gauging system according to the present invention.

An example of an embodiment of the invention is here described with support of the enclosed FIG. 2. The figure depicts a block diagram over the function of a radar level gauge, for which the level gauging system according to the aspects of the invention is used.

Figure 1:
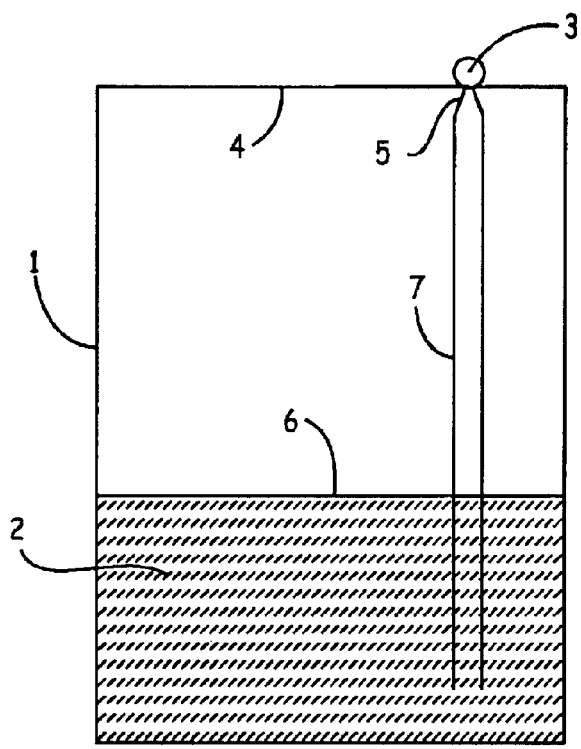
FIG. 1 shows a schematic view of a container in which a medium is stored and where a radar level gauge is arranged at the roof of the container for measuring the level of a surface of a product stored in the container.

An application of a radar level gauge is shown in FIG. 1. A container 1 is used for storing a product 2. A closed container is here used to represent the storage room. The product may be such as oil, refined products, chemicals and liquid gas, or may be a material in powder form. A radar 3 is attached to the roof 4 of the container 1. A microwave beam is transmitted from the radar via an antenna 5 at the interior of the container. The transmitted beam is reflected from the surface 6 of the product and is received by the antenna 5. By means of a comparison and evaluating of the time lap between transmitted and reflected beam in a calculation and controlling unit, a determination of the level of the product surface 6 in a known manner is performed. In the figure, there is further shown that the microwave is transmitted via a wave guide 7, which communicates with the product. The radar level gauge as shown in FIG. 1 is only used as one example. The invention can just as well be used for a radar level gauge with a freely propagated beam and it could be used for any kind of level gauging, where the level of a product surface is supervised.

In FIG. 2 there is shown a container wall, the container roof 4, with an antenna unit 5 for microwaves sent from a radar. The antenna unit 5 is mounted inside the container. Two independent radar level gauging devices are shown in the figure. Forming a first measuring channel, a first radar level gauging device 10 used as a high level alarm is connected to the antenna unit 5. The microwave transmitter and receiver of the first gauging device is denoted T/R-1 in FIG. 2. In a first processing unit 11 of said first device, the calculation of the level of the surface is made based on the time delay of the reflected microwave signal back to the antenna as stated. A first signal 12 with information about the calculated level is sent to an alarming unit. This alarming unit 13 can be designed in several ways to alert an operator about the current situation. As some examples: an acoustic signal can be activated, alarming lamps can start to light or twinkle or some kind of signalling can be activated on a control board, alarms on a computer screen or a remote unit (phone, minicall, radio etc.) are activated. The alarm is set to be activated in dependence of the level of the surface. At a certain value, a first threshold value of the level, the alarming unit 13 is activated. This first threshold is usually set to 95% of full container. For forming a second measuring channel, a second radar level gauging device 14 used as an overfill control is also connected to the antenna unit 5. The microwave transmitter and receiver of the second gauging device is denoted T/R-2 in FIG. 2. In a second processing unit 15 of said second device, the calculation of the level of the surface is made based on the time delay of the reflected microwave signal back to the antenna as stated. A second signal 16 with information about the calculated level is sent to an overfill control unit 17. This overfill control unit 17 can be designed in several ways. As some examples: an acoustic signal can be activated, alarming lamps can start to light or twinkle or some kind of signalling can be activated on a control board to alert an operator as discussed above. The overfill control is set to be activated in dependence of the level of the surface. At a certain value, normally at 98% of maximum level, a second threshold value of the level, the overfill control unit is activated.

The two separate channels 10 and 14 use the same antenna unit 5, which is possible by use of a microwave feeder 18 which feeds the antenna unit by microwaves from the transmitters in units T/R-1 and T/R-2 respectively and receives from the antenna unit the reflected microwaves in the receivers of units T/R-1 and T/R-2 respectively. The signals of the respective channel are made distinguishable by known means. The two level measuring channels constituted by the two level gauging devices 10 and 14 are completely galvanically isolated from each other to fulfill complete separation between the two channels.

From each of the level gauging devices 10 and 14, signals are output from the processing units 11, 15 of the respective gauging device, where said signals contain information about the level of the surface of the product independently of each other. Said signals 19, 20 are forwarded to an indication unit 21, where a mean value or a median value of said level is determined. The value of the level generated in the indication unit 21 is then used as a currently displayed value of the level of the surface of the product. This measured value can be shown on a display, or be shown for use in a computer. The displayed value is thus independent of at least one of the level gauging devices 10, 14. The level gauging system may thus be looked upon as a three channel system, where only two physical level gauging devices are used.

What is claimed is:

1. A level gauging system for calculating the level of the surface of a product in a storage room, the system comprising:
   a first gauging device for calculating a first value of said level and functionally separated from said first gauging device of second gauging device for calculating a second value of said level,
   characterized in that
   the first gauging device is adapted to produce a first signal in dependence of a preset first threshold value of said level and to output a first current level value signal,
   the second gauging device is adapted to produce a second signal in dependence of a preset second threshold value of said level and to output a second current level value signal,
   and that the system includes an indicating unit adapted to receive at least one of said first value signal and said second level value signal for presenting the value of the current level of said surface,
   wherein said indicating unit is adapted to receive both the first and second current level value signals and to determine an appropriate value of the presented current level value based on said first and second current level values.

2. A level gauging system according to claim 1, wherein said system comprises a first alarm, which is activated by said first signal.

3. A level gauging system according to claim 2, wherein said first alarm is a high level alarm.

4. A level gauging system according to claim 1, wherein said system comprises a second alarm, which is activated by said second signal.

5. A level gauging system according to claim 4, wherein said second alarm is an overfill alarm.

6. A level gauging system according to claim 1, wherein the presented current level value is a mean value or a median value of the first and second level values.

7. A level gauging system according to claim 1, wherein at least one of said gauging devices is a radar level gauge.

8. Method for calculating the level of the surface of a product in a storage room by means of a radar level gauging system including a first gauging device for calculating a first value of said level and functionally separated from said first gauging device a second gauging device for calculating a second value of said level, the method comprising the steps:

producing a first signal in dependence of a preset first threshold value of said level in the first gauging device, outputting a first current level signal from said first gauging device, producing a second signal in dependence of preset second threshold value of said level in the second gauging device, outputting a second current level value signal from said second gauging device and presenting the value of the current level of said surface by means of an indicating unit receiving at least one of said first level value signal and said second level value signal for evaluation of the said current level value, wherein said indicating unit uses both the first and the second current level value signals for determining an appropriate value of the presented current level value.

9. Method according to claim 8, wherein said first signal activates a first alarm.

10. Method according to claim 8, wherein said second signal activates a second alarm.

11. Method according to claim 8, wherein the indicating unit calculates a mean value or a median value of the first and second level values for use as said presented current level value.

* * * * *